United States Patent

Lu

Patent Number: 5,940,936
Date of Patent: Aug. 24, 1999

[54] PIVOT DEVICE FOR USE WITH A MONITOR

[76] Inventor: Sheng-Nan Lu, No. 174, Chunying St., Shulin Chen, Taipei Hsien, Taiwan

[21] Appl. No.: 09/109,791

[22] Filed: Jul. 2, 1998

[51] Int. Cl.[6] .................................................. E05C 17/64
[52] U.S. Cl. ............................. 16/337; 16/386; 411/526; 411/501; 403/277
[58] Field of Search ............................. 16/337, 338, 339, 16/340, 386, 382, 383; 403/153, 154, 277, 279, 281; 411/525, 526, 501, 503

[56] References Cited

U.S. PATENT DOCUMENTS

| | | | |
|---|---|---|---|
| 5,269,047 | 12/1993 | Lu | 16/340 |
| 5,553,962 | 9/1996 | Eustache | 403/154 |
| 5,826,307 | 10/1998 | Chin-Fu | 16/340 |

*Primary Examiner*—Chuck Y. Mah
*Attorney, Agent, or Firm*—Holland & Hart LLP

[57] ABSTRACT

A pivot device for use with a notebook computer has a keyed washer and an axle corresponding to the keyed washer. The keyed washer has a keyed opening defined therein and a plurality of keys formed on an inner periphery defining the keyed opening. The axle has a plurality of slots defined in an end thereof, such that when the axle is inserted into the keyed washer, the keys will be forced into one of the corresponding slots and thus a secure connection between the axle and the keyed washer is achieved.

3 Claims, 4 Drawing Sheets

PIVOT DEVICE FOR USE WITH A MONITOR

BACKGROUND OF THE INVENTION

1. Field of the Invention

The present invention relates to a pivot device, and more particularly to a pivot device for use with a monitor whose angle is able to be adjusted as required. The pivot device has an axle rotatably mounted onto a bracket which is securely connected to a face of a monitor or a main frame of a notebook computer. A plurality of slots are defined in both edges of the axle. A keyed washer defines therein a central hole and a plurality of keys each adapted to correspond to one of the slots are formed on a face defining the central hole. A diameter of the central hole is slightly larger than a diameter of the axle. Therefore, when the bracket is firstly mounted on the axle and the axle is then inserted into the keyed washer via insertion of each of the keys into one of the corresponding slots, the bracket is securely and rotatably mounted onto the axle.

2. Background

Due to the popularity of notebook computer, users begun to demand a higher quality of all elements of the product. Among them, a problem of providing suitable resistance for the monitor in order to support it in any desired position seems to bother most users and manufacturers as well. The supporting force provided to the monitor of the notebook computer is applied by a spring or the like. However, the spring or the like when installed in the monitor is secured on a pivot by a nut. The spring or the like will gradually become loose as the number of the monitor openings and closings increases. A conventional pivot device of the type described above is shown in U.S. Pat. No. 5,333,356. The pivot device 1, as shown in FIG. 5, having a nut 2 to secure a spring 3 within a leave 4 is shown, wherein the nut 2 will gradually become loose as the number of the leave 4 pivots increases. A loose monitor often causes trouble to the users, because they can not have a good view of the monitor. They have to place other object(s) on the back of the monitor to support the monitor and to prevent the monitor from falling or to tighten the nut in order to store the desired resistance.

Furthermore, the resistance force provided by the spring or the like is determined by the degree of tightness of the nut 2. Therefore, how to precisely control the threading connection of the nut 2 in the pivot device in mass production is a difficult problem for all manufacturers. Accordingly, an improvement or change to the conventional pivot device is necessary.

The present invention provides an improved pivot device for use with a notebook computer to obviate and/or mitigate the aforementioned problems.

SUMMARY OF THE INVENTION

The primary object of the invention is to provide an improved pivot device having an axle rotatably mounted onto a bracket which is securely connected to a face of a monitor or a main frame of a notebook computer, a plurality of slots defined in both edges of the axle, a keyed washer defined therein a central hole and a plurality of keys formed on a periphery defining the central hole and each of which is adapted to correspond to one of the slots.

According to one aspect of the invention, the pivot device constructed in accordance with the invention provides a keyed washer with a central hole and a plurality of keys formed on the periphery defining the central hole and an axle having a plurality of slots defined in both edges thereof. Forcing each one of the keys of the keyed washer into one of corresponding slots of the axle will thus secure a spring or the like within the pivot device of the invention.

Another object of the invention is to provide an annular ring formed on the axle, such that the compression of the spring or the like is able to be precisely controlled by the position where the annular ring is formed.

Still, a further object of the invention is that in order to provide suitable resistance to the monitor, the plurality of slots have a required depth which is determined by the degree of the compression of the spring or the like by the keyed washer, such that when the keyed washer is securely engaged with the axle, the spring or the like within the pivot device of the invention is able to have a suitable compression from the keyed washer.

Other novel features and advantages of the invention will become more apparent from the following detailed description when taken in conjunction with the accompanying drawings.

DETAILED DESCRIPTION OF THE PREFERRED EMBODIMENT

Figure 1:
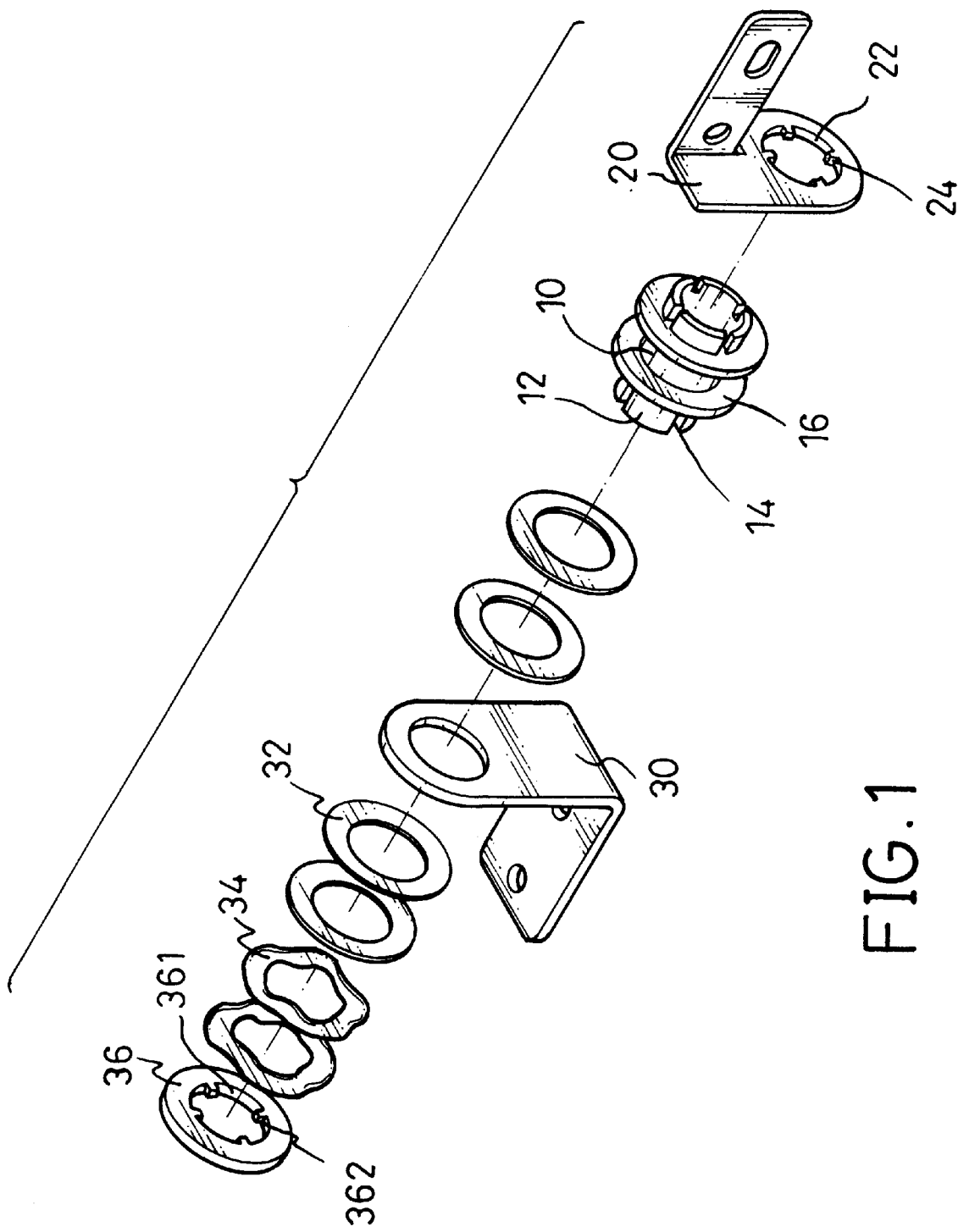
FIG. 1 is an exploded view of the pivot device constructed in accordance with the invention.

Referring to FIG. 1, a pivot device for use with a notebook computer and constructed in accordance with the present invention is shown. The pivot device comprises an axle 10 having a plurality of slots 14 defined in two opposed ends 12 thereof and at least two spaced annular rings 16 formed thereon and respectively adjacent to a bottom of each of the slots 14, a bracket 20 having a keyed opening 22 defined therein and a plurality of keys 24 formed on a periphery defining the keyed opening 22, a support 30 having an opening 31 defined therein for receiving one end 12 of the axle 10 therethrough, a plurality of spring washers 34 compressibly engaged on one end 12 of the axle 10, a plurality of flat washers 32 respectively disposed on both sides of the opening 31 to abut one face of the spring washer 34 and to prevent direct friction between the support 30 and one of the annular ring 16 and a keyed washer 36 securely engaged with the end 12 of the axle 10 and having a keyed opening 361 defined therein and a plurality of keys 362 formed on an inner periphery defining the keyed opening 361 and each of which is corresponding to one of the slots 14 of the axle 10.

It is to be noted that the bracket 20 and the support 30 are securely attached to a face of either a monitor (not shown) or a main frame (not shown) of a notebook computer (not shown) and since this portion is conventional in the art, detailed description thereof is not necessary.

Figure 2:
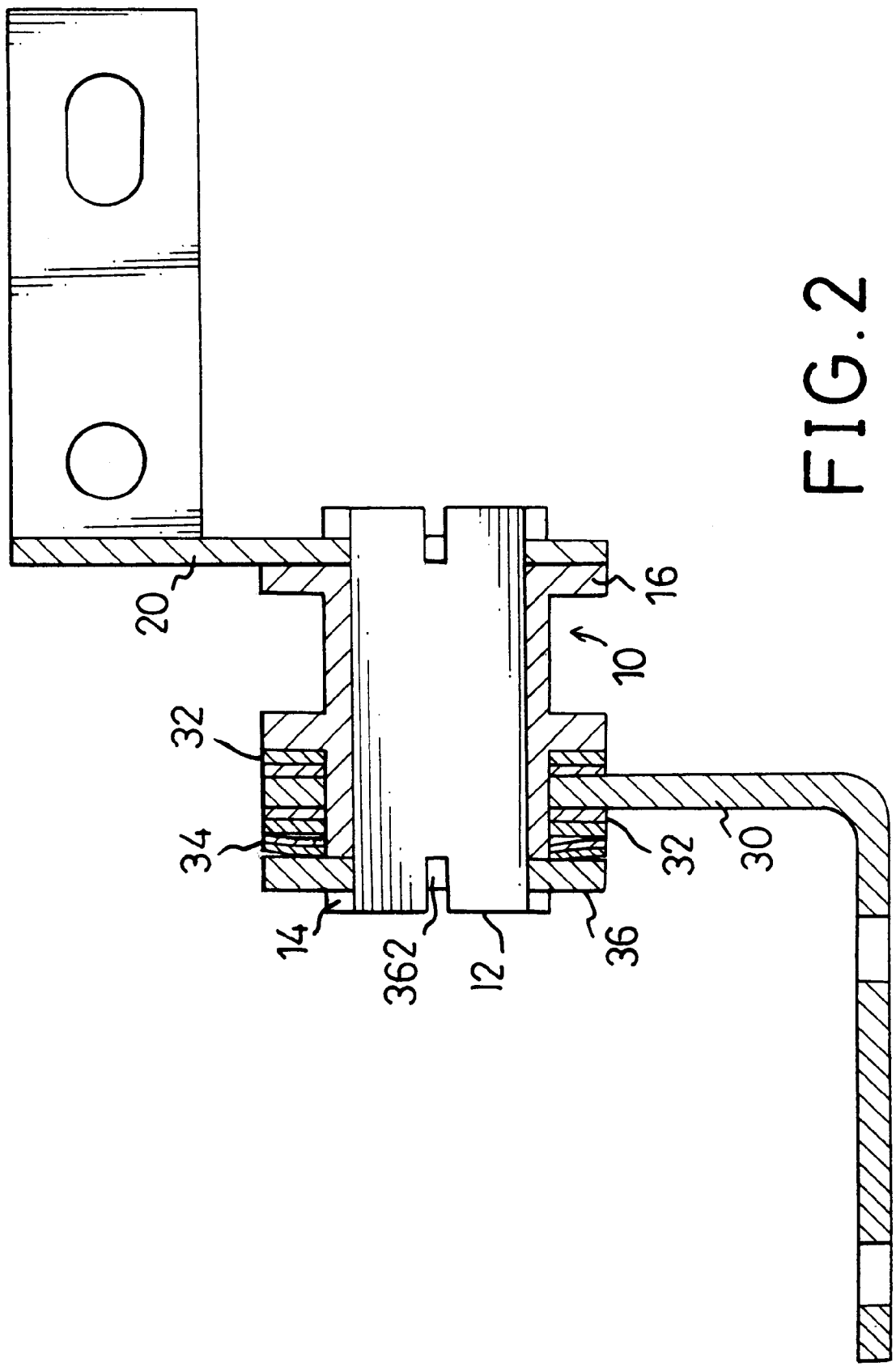
FIG. 2 shows a partial cross sectional view of the pivot device in assembly.

Referring to FIG. 2, when the pivot device of the invention is assembled, due to the provision of the slots 14 defined in both sides 12 of the axle 10 and the provision of the keyed opening 22 in the bracket 20, the bracket 20 is able to be securely connected with the end 12 of the axle 10 via each one of the keys 24 inserted into one of the corresponding slots 14 of the axle 10. After the flat washers 32 and the spring washers 34 are sequentially disposed on sides of the support 30 in the way described above, the other end 12 of the axle 10, which is free from connection with any device, is inserted through the flat washers 32 and the spring washers 34. Eventually, the keyed washer 36 is securely connected with the end 12 of the axle 10 via each one of the keys 362 inserted into one of the corresponding slots 14 of the axle 10.

Figure 3:
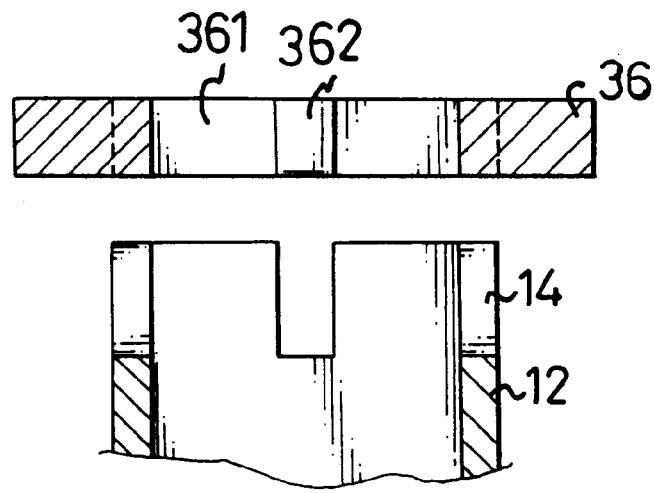
FIGS. 3 and 4 are schematic views showing a state of before/after a keyed washer assembled with an axle of the invention.
Figure 4:
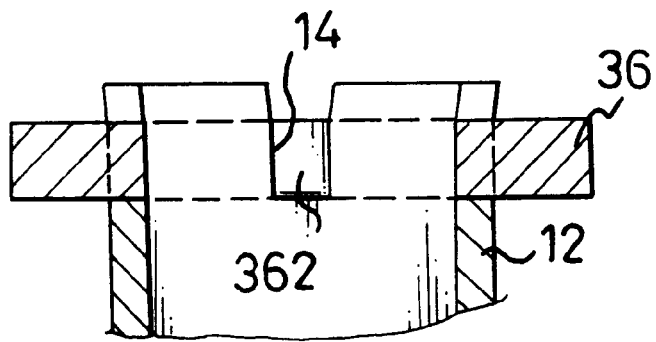
Figure 5:
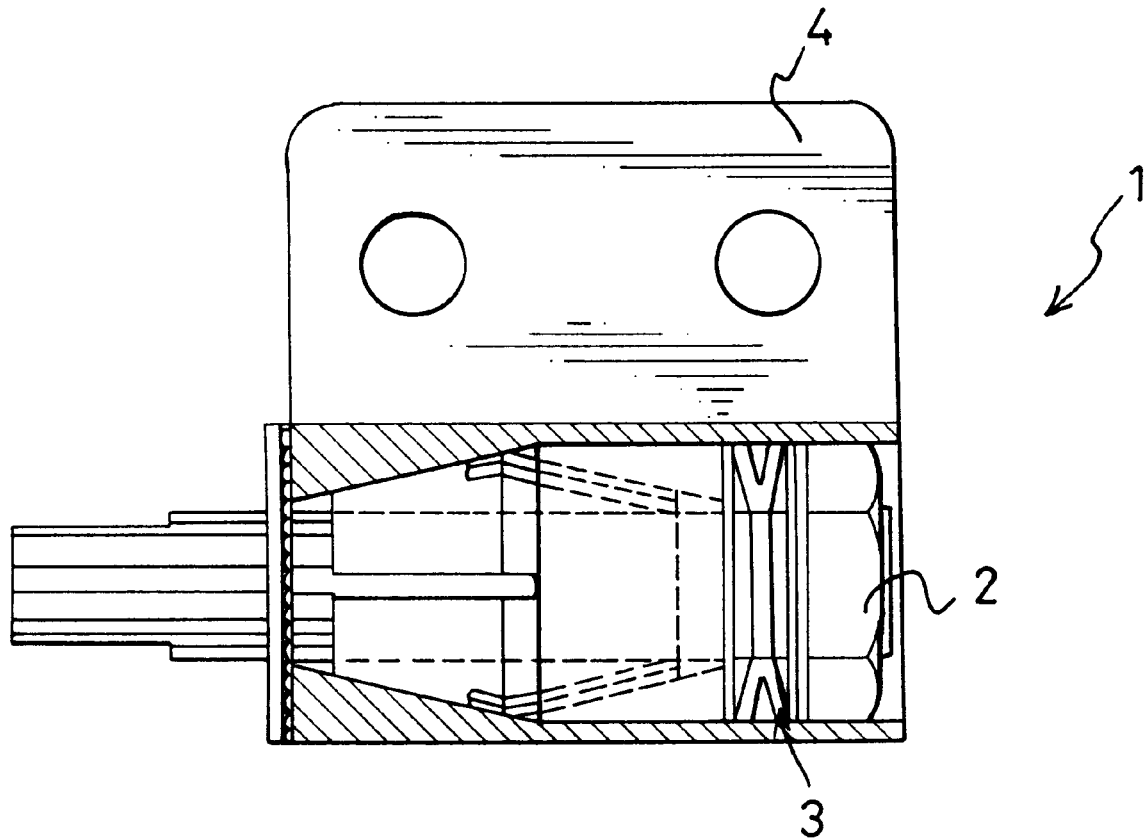
FIG. 5 is a schematic cross sectional view of a conventional pivot device.

Referring to FIGS. 3 and 4, an inner diameter of the keyed opening 361 of the keyed washer 36 is fractionally larger than an outer diameter of the end 12 of the axle 10, such that the end 12 is able to be easily inserted through the keyed opening 361 of the keyed washer 36. Furthermore, a width of each of the keys 362 of the keyed washer 36 is larger than a width of each of the slots 14 of the axle 10, therefore, when the end 12 of the axle 10 is inserted into the keyed opening 361 of the keyed washer 36, and the keys 362 are forced into each one of the corresponding slots 14 to expand the width of the slots 14. Thus, the keyed washer 36 is secured on the end 12 of the axle 10 due to the deformation of the slots caused by the insertion of the keys 362.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed.

What is claimed is:

1. A pivot device for use with a notebook computer comprising an axle, means for providing suitable resistance relative to the axle and means rotatably mounted onto the axle for attachment to the monitor, wherein the improvements are:

a keyed washer adapted to secure the resistance means and the attachment means on the axle has a keyed opening defined therein for receiving the axle therethrough and a plurality of keys formed on an inner periphery defining the keyed opening; and a plurality of slots are defined in both ends of the axle, each one of the slots being corresponding to one of the each of the keys of the keyed washer, so as to allow each of the keys to be inserted into one of the corresponding slots of the axle.

2. The pivot device as claimed in claim 1, wherein an inner diameter of the keyed opening is the same as a diameter of the axle.

3. The pivot device as claimed in claim 1, wherein a width of each of the keys is larger than a width of each of the slots.

* * * * *